United States Patent [19]

Tramposch

[11] Patent Number: 4,598,781

[45] Date of Patent: Jul. 8, 1986

[54] LOAD CELL HAVING A FLEXURE CONNECTOR

[75] Inventor: Herbert Tramposch, Riverside, Conn.

[73] Assignee: Pitney Bowes Inc., Stamford, Conn.

[21] Appl. No.: 614,074

[22] Filed: May 25, 1984

[51] Int. Cl.⁴ ............................ G01G 3/08; G01G 3/14
[52] U.S. Cl. ...................................... 177/211; 177/229
[58] Field of Search .................................. 177/211, 229

[56] References Cited

U.S. PATENT DOCUMENTS

| | | | |
|---|---|---|---|
| 2,859,613 | 11/1958 | Green | 177/211 X |
| 4,505,345 | 3/1985 | Jetter | 177/229 X |
| 4,509,610 | 4/1985 | Hayashi | 177/229 X |

Primary Examiner—E. A. Goldberg
Assistant Examiner—Patrick W. Foster
Attorney, Agent, or Firm—Peter Vrahotes; William D. Soltow, Jr.; Albert W. Scribner

[57] ABSTRACT

A load cell having a flexure connector that provides connection between the load beam of the load cell and the sensing beam. The structure has a low profile and provides an adjusting feature that compensates for the variations in resistance of the load cell strain gages.

17 Claims, 3 Drawing Figures

LOAD CELL HAVING A FLEXURE CONNECTOR

BACKGROUND OF THE INVENTION

Load cells are being used more frequently because of the high accuracy one is able to obtain with such a device. In a load cell, strain gages are used to determine a load by serving as resistors in a Wheatstone bridge. The changes in resistance in the strain gages which results from a load being applied to the sensing beam of the load cell are measured to determine the load. In single point load cells, the strain gages are located on opposite sides of the load transfer point with those on one side being under compression and those on the other side being under tension when the load is applied. Recently, load cells of a unitary construction have been proposed wherein the entire assembly is made of one piece. The shortcoming of prior structures is that they tend to have a relatively large profile resulting in a load cell with a relatively large height. In addition, alterations must be made to balance the load cell. The latter is necessitated because the electrical resistance of the strain gauges which form the Wheatstone bridge circuit are not identical.

SUMMARY OF THE INVENTION

A load cell has been conceived that has a relatively long flex link which spans the distance from the load sensing beam substantially to the top of the load cell. It assures maximum flexibility because of its length and, at the same time, allows a low profile of the load cell. In addition, the structure allows compensation for the variance in the resistance of the strain gauges thereby eliminating the need for alterations required to compensate for the variation in restances. Such variation in resistance is a result of manufacturing tolerances. Even though the differences in resistance are small, they are sufficient to generate zero load signals which, in most cases, exceed the limit the electronic circuit of the load cell can accommodate. Prior load cells compensated for the imbalance by soldering onto the bridge circuit a measured length of constantan wire.

DETAILED DESCRIPTION OF THE PREFERRED EMBODIMENT

Figure 1:
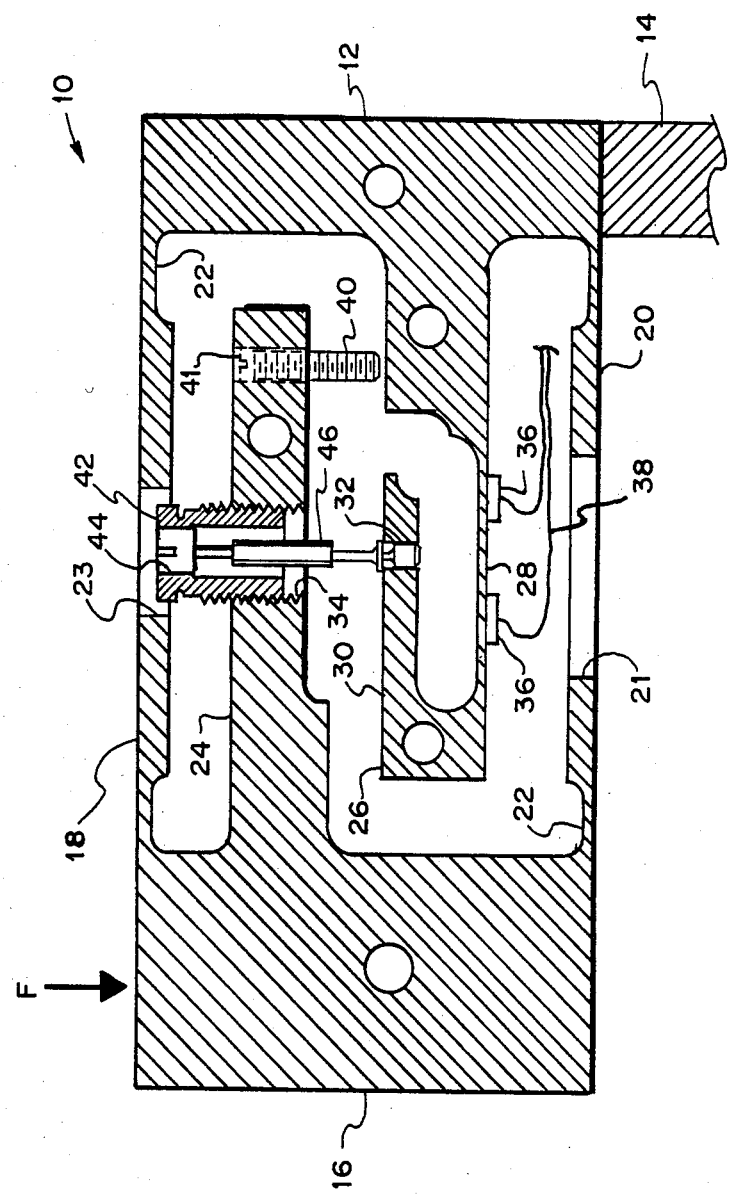
FIG. 1 shows a cross sectional view of a load cell in which the instant invention is utilized.
Figure 2:
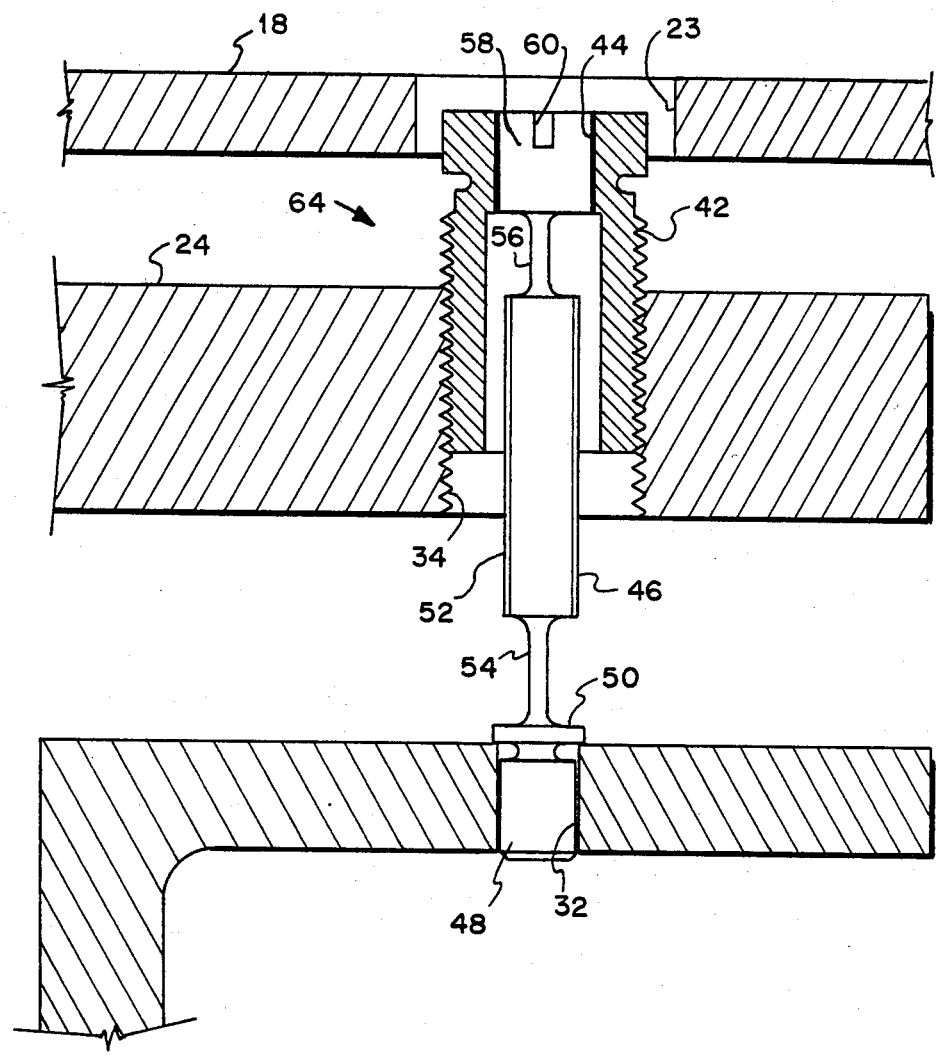
FIG. 2 is an enlarged view of a section of the load cell shown in FIG. 1 showing the flexure connector in greater detail.

Referring now to FIGS. 1 and 2, a load cell is shown generally at 10 and includes a fixed member 12 that is supported by a base 14 and a movable member 16 that will move in response to a force F applied thereto as shown in FIG. 1. A pair of connecting links 18 and 20 are integral with and connect the fixed member 12 and the movable member 16 to form a parallelogram. Each of the connecting links 18, 20 has a pair of laterally extending joints 22 therein. The lower connecting link 20 has a window 21, or rectangle opening, therein and the other connecting link 18 has a circular opening 23 therein.

A load beam 24 extends from the movable member 16 and a sensing beam 26 extends from the fixed member 12 spaced from and below the load beam. The sensing beam 26 has a generally C-shaped configuration with a lower load sensing portion 28 and an upper portion 30 that has an opening 32 therein. The opening 32 is in axial alignment with the opening 23 in the connecting link 18. The opening 32 of the upper portion 30 is also axially aligned with a threaded opening 34 in the load beam 24. Four strain gages 36 (only two being seen in FIG. 1) are secured to the load sensing portion 28 and have leads 38 extending therefrom. The window 21 is provided to allow access to the load sensing portion 28 so that the strain gages 36 may be secured thereto.

A set screw 40 is received within a threaded opening 41 of the load beam 24 and extends to within a short distance of the sensing beam 26. This set screw 40 acts as a overload preventor for the strain gages 36 as is well known in the art.

The opening 34 of the load beam 24 receives a threaded cap 42 that has an opening 44 at the top thereof. A flex link 46 has a plug 48 at one distal end thereof with a flange 50 that has a somewhat larger diameter than the plug. The plug 48 is snugly received within the opening 32 while the flange 50 abuts the upper portion of the sensing beam 26. The balance of the flex link 46 includes a generally cylindrically-shaped member having a central portion 52 with reduced diameters 54, 56 integral with and on opposite ends of the central portion. At the distal end of one reduced portion 56 and integral therewith is a cylindrical head 58 that has a slot 60 therein. The cylindrical head 58 is slightly larger than the flange 50 which is integral with the other reduced portion 54 so that the flex link 46 may be inserted through the openings 44.

Figure 3:
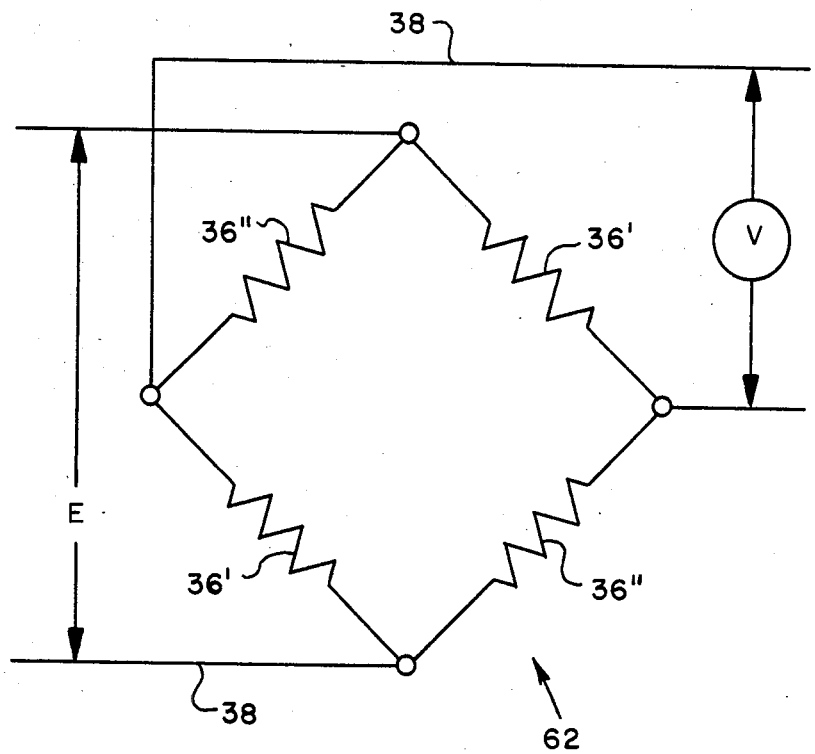
FIG. 3 is a diagramatic representation of a Wheatstone bridge.

Referring now to FIG. 3, a diagramatic representation is shown of the load cells 36 as they form a Wheatstone bridge 62 in combination with the leads 38. A lead 38 extends from each junction of the load cells 36. The load cells 36' will be, for example, under compression, and the load cells 36" will be under tension when a force F is applied to the load cell 10. A small voltage E is applied to the junctions between the respective strain gages 36', 36". A volt meter V is connected between two of the leads 38 so that it will measure the change in voltage in the strain gages 36 that results from a force F being applied to the movable member 16. By way of testing, a small known voltage E may be applied across the leads when no load is applied and the volt meter V will show the imbalance occasioned by the variance of the resistance in the load cells 36.

The flex link 46 and the threaded cap 42 combine to form a flexure connector 64. The actual flexing is achieved by bending the flex link 46 at the reduced diameters 54, 56. The head 58 is pressfitted into the opening 44, and the plug 48 is free to rotate inside the opening 32 provided in the load sensing beam 26. It will be noted that the flexure connector 46 extends from the sensing beam 26, through the opening 23 in the connecting link 18 and extends virtually to the top of the load cell 10.

The assembly of the flex link 46 within the load cell 10 takes place after all electrical connections with the power source E and voltmeter V have been completed and voltages generated in the Wheatstone bridge can be recorded. During assembly, the flexure connector 64, with the flex link 46 secured thereto, is threaded into the opening 34 of the load beam 24. The plug 48 will be received within the opening 32 of the sensing beam and the flange 50 will abut the upper surface thereof. Signals from the Wheatstone bridge will be monitored as a small voltage E is applied. The signal from the Wheatstone bridge will vary as the distance of the sensing beam 26 relative to the load beam 24 changes as a result of the rotational movement of the flexure connector 64. With such change in distance between the sensing beam 26 and the load beam 24, each of the load cells will be placed under a different tension or compression thereby changing its resistance.

As stated previously, the resistances of the four strain gages which form the bridge circuit in all likelihood will differ from each other. Even though the differences are small, they are enough to generate zero load signals, which in most cases, exceed the limits the electronic circuit can accommodate. Prior load cells compensate for the imbalance by soldering onto the bridge circuit an appropriate length of constantan wire. The design disclosed here eliminates the need for constantan wire by simply preloading the load sensing beam. Through adjustment of the flexure connector, the monitored signal may be adjusted to read zero. The flexure connector is then locked in place with an adhesive such as LOCTITE (a registered trademark of Loctite Corporation of Newington, Conn.). The same adhesive may also applied to the plug 48 and flange 50 of the flex link 46 to render the assembly permanent if desired, but it is not necessary because a force is ordinarily applied upon the sensing beam 26 by the flex link 46.

As can be appreciated, what has been provided is a structure whereby a flexure connector 64 of relatively large length is provided in such a way that the profile of the load cell 10 will be kept at a minimum. This is possible because the flexure connector 46 extends from the load sensing arm 26 vertually to the top of the load cell 10. It has been found that this structure not only has the advantage of such low profile, but provides the ability to compensate for variance in resistance of strain gages in a way that is rapid and inexpensive.

The preferred embodiment has been shown with a flex link 46 having a relatively large diameter central portion 52 and reduced diameters 54, 56 on opposite ends thereof. This particular configuration is dictated by machine convenience considerations as the flex link 46 may be a rod having a single diameter. The selection of the diameter in the case of a rod with a uniform cross section, or the reduced diameters 54, 56, is dictated by the formula:

$$L/A < S$$

Where
L=the maximum load to be applied
A=the cross sectional area, and
S=the yield point.

The diameter of the flex link 46 with a uniform cross section will be such that the diameter is sufficiently large so that the load to area ratio is slightly less than the yield point. As an example, in using an aluminum rod with a yield stress of 50,000 lbs./in$^2$, the diameter should be approximately 1/32". A diameter of 1/32" has a cross sectional area of approximately $7.7 \times 10^{-4}$ in$^2$ which is much greater than $1 \times 10^{-4}$ required according to the formula for a maximum load of five pounds. The maximum length of the flex link is given by the critical slenderness ratio for columns in accordance with the formula:

$$l/r < 120$$

Where
l=length of the flex link
r=radius of gyration

In the preferred embodiment, the length of the flex link was $\frac{5}{8}$". Using the above formula:

$$l/r = 0.625/(1/128) = 80$$

Since this is less than 120, the length is within the limits required for a short column and buckling is not a factor.

It will be appreciated that a flex member 46 having a configuration such as shown in FIGS. 1 and 2 will not have the concerns relative to length that a column with a uniform cross section would have because the central portion 52 provides greater resistance to buckling.

What is claimed is:

1. In a load cell having a fixed support member, a movable support member, and a pair of links connecting the fixed support member and the movable support member to form a parallelogram, a first beam extending from the fixed support member, a second beam extending from the movable support member and a longitudinally connecting member between the first beam and second second, the connecting member comprising:
 a cylindrical member having a central portion and end portions on opposite longitudinal ends of the central portion, the end portions of the cylindrical member having reduced diameters, means for engaging one end of one of said cylindrical member with one of said beams, the end of the other of said cylindrical member extending through the other of said beams and means for connecting said other end to said other beam.

2. The load cell of claim 1 wherein one end portion has a combination of a plug and a flange and the other end is threaded, said other end being received within a threaded opening within said other beam.

3. The load cell of claim 1 wherein said other beam has an opening and said cylindrical member extends through said opening.

4. The load cell of claim 3 wherein one of the links has an opening therein and receives a portion of said cylindrical member that extends through said other beam opening.

5. In a load cell having a fixed support member, a movable support member, and a pair of links connecting the fixed support member and the movable support member to form a parallelogram, a sensing beam extending from the fixed support member, a load beam extending from the movable support member and a longitudinally connecting member providing connector between the sensing beam and the load beam, the connecting member comprising:
 a cylindrical flex link having a central portion intermediate reduced portions having diameters less than the diameter of said central portion, means for engaging one of said reduced portions with said sensing beam, the other of said reduced portions extending through said load beam and means for connecting said other reduced portion to said load beam.

6. The load cell of claim 5 wherein said flex link is movable whereby the distance between said beams is adjustable.

7. The load cell of claim 6 wherein the flex link end received within said load beam is threadingly received therein.

8. In a load cell having a fixed support member, a movable support member, and a pair of links connecting the fixed support member and the movable support member to form a parallelogram, a sensing beam extending from the fixed support member, a load beam extending from the movable support member and a longitudinally connecting member providing connection between the load beam and sensing beam, the improvement comprising:
an opening within the load beam,
an opening within the sensing beam,
a cylindrical member having a cylindrical central portion intermediate and integral with two cylindrical portions, said two reduced cylindrical portions having diameters less than the diameter of said central portion,
one end of one of said cylindrical member being received within the opening of said sensing beam,
means for connecting said one end of said cylindrical member to said sensing beam, and
the end of the other of said reduced portions extending through the opening of said load beams and being connected thereto.

9. In a load cell having a fixed support member, a movable support member, and a pair of links connecting the fixed support member and the movable support member to form a parallelogram, a first beam extending from the fixed support member, a second beam extending from the movable support member and a longitudinally connecting member between the first beam and second second, the connecting member comprising:
a cylindrical member having one end engaging one of the beams and the other end extending through the other of said beams and being connected thereto.

10. The load cell of claim 9 wherein said one beam has an opening and said one end has a plug received written said opening and a flange in engagement with said one beam and the other beam has a threaded opening, said other end is threaded and is received within said threaded opening within said other beam.

11. The load cell of claim 9 wherein said other beam has an opening and said cylindrical member extends through said opening.

12. The load cell of claim 3 wherein one of the links has an opening therein and receives a portion of said end that extends through said other beam opening.

13. The load cell of claim 9 including means for varying the length of the connecting member located intermediate the first beam and the second beam.

14. In a load cell having a fixed support member, a movable support member, and a pair of links connecting the fixed support member and the movable support member to form a parallelogram, a sensing beam extending from the fixed support member, a load beam extending from the movable support member and a longitudinally connecting member between the load beam and sensing beam, the improvement comprising:
an opening within the load beam,
said connecting member being a cylindrical member having one end in engagement with the sensing beam,
the end of the other end extending through the opening of said load beam, and
means for connecting said other end to the load beam.

15. The load cell of claim 14 wherein the sensing beam has an opening therein and said one end has a combination of a plug and a flange said plug being received with said sensing beam opening and said flange being in abutting engagement with the sensing beam and the said opening of the load beam is threaded, said other end being threaded and received within said threaded opening within said one beam.

16. The load cell of claim 14 wherein said load beam has a threaded opening and including a threaded cap received within the threaded opening of the load beam of said cylindrical member being received with said threaded cap and extending through said threaded opening of the load beam.

17. The load cell of claim 16 wherein one of the links has an opening therein and receives a portion of said end of said cylindrical member that extends through said load beam opening.

* * * * *